J. A. ANDERSON.
CORN PLANTER.
APPLICATION FILED AUG. 21, 1911.
1,044,431.
Patented Nov. 12, 1912.
2 SHEETS—SHEET 1.
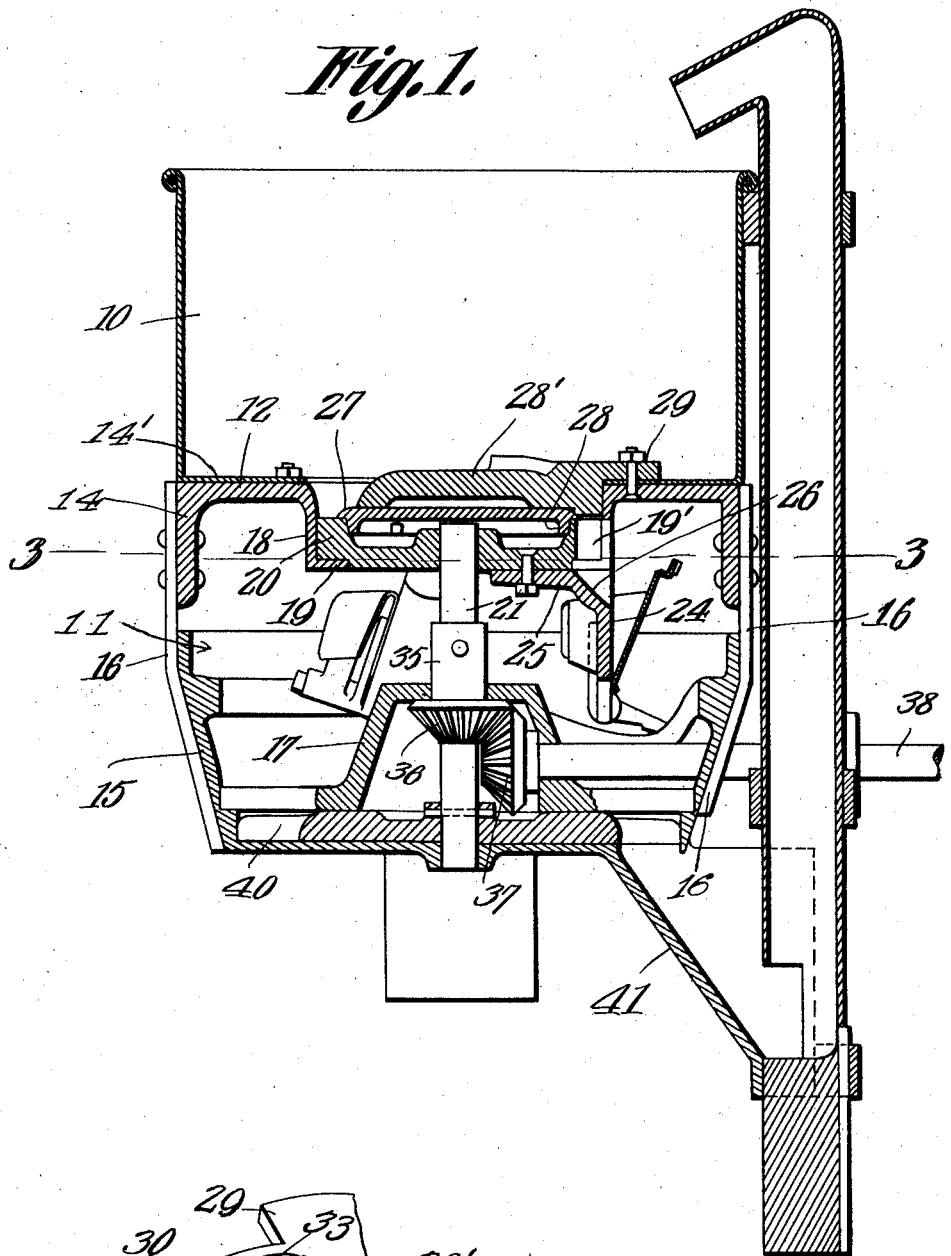
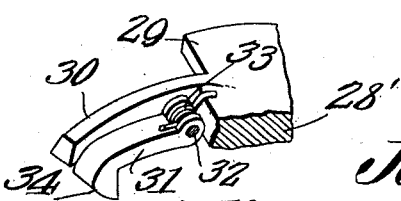
John A. Anderson
Inventor, J. A. ANDERSON.
CORN PLANTER.
APPLICATION FILED AUG. 21, 1911.
1,044,431.
Patented Nov. 12, 1912.
2 SHEETS—SHEET 2.
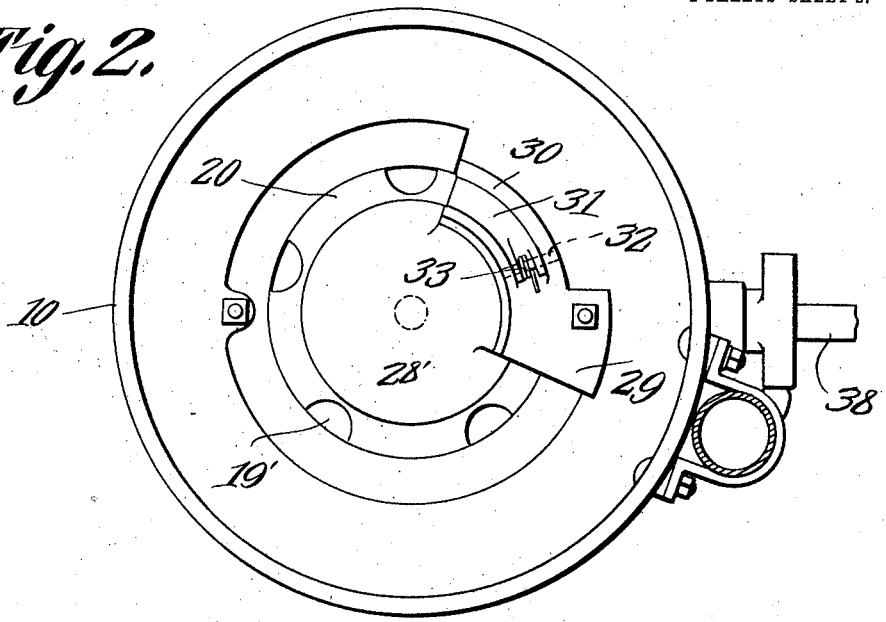
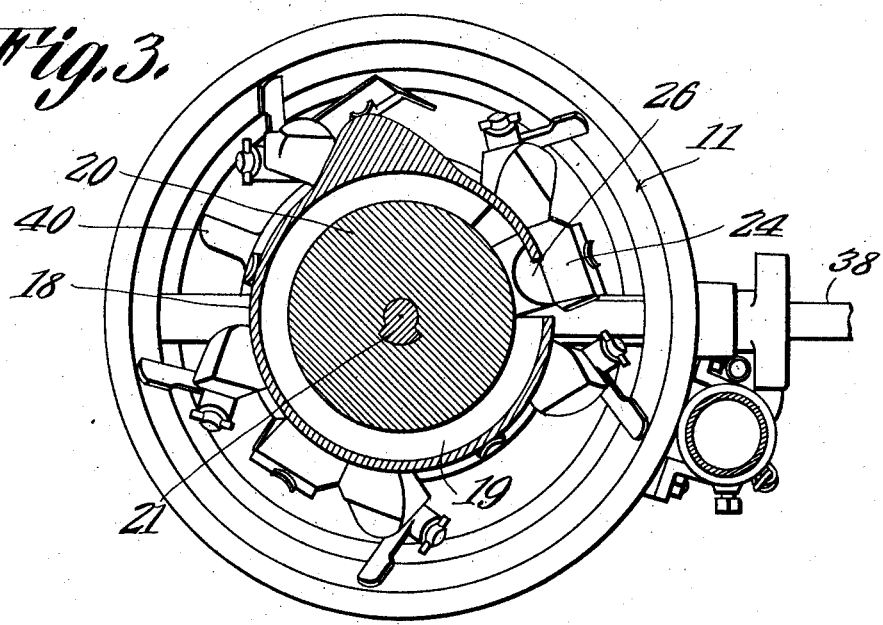
John A. Anderson
Inventor,
Witnesses
by C. A. Snow & Co.
Attorneys.

UNITED STATES PATENT OFFICE.

JOHN A. ANDERSON, OF GENESEO, ILLINOIS.

CORN-PLANTER.

1,044,431. Specification of Letters Patent. Patented Nov. 12, 1912.

Application filed August 21, 1911. Serial No. 645,122.

*To all whom it may concern:*

Be it known that I, JOHN A. ANDERSON, a citizen of the United States, residing at Geneseo, in the county of Henry and State of Illinois, have invented a new and useful Corn-Planter, of which the following is a specification.

This invention relates to an improvement in seed planters.

The primary object of the present invention is to improve and simplify the construction of the distributing mechanism shown in Patent No. 911,691, dated February 9, 1905.

In the drawings:—Figure 1 is a vertical section. Fig. 2 is a top plan view. Fig. 3 is a section on the line 3—3 of Fig. 1. Fig. 4 is a detail view of the resilient wiper.

In the drawings, 10 designates the main hopper which is supported above a lower hopper 11. Both hoppers are supported by a frame which is supported by the annular member 12 which forms the upper portion of the supporting frame, the hopper 10 being provided with the annular flange 14' which is bolted or otherwise secured to the annular member 12. The supporting frame consists of the base portion 15 which forms the lower hopper, the member 14 being supported and held in spaced relation to the lower hopper by the standards 16. Arranged within the lower hopper is the centrally disposed conical member 17 which forms a support for the shaft 21 which drives the distributing mechanism. The annular supporting member 14' is formed with a centrally disposed downwardly extending flange 18 which is formed with the extension 19 to support the distributing plate 20 mounted on the shaft 21, which is supported by the conical member 17. This plate 20 has portions of its periphery removed to form pockets 19' which convey the seeds to an aperture 19'' formed in the flange 19 which allows the seeds to fall within a selector 24, the selectors being secured to the under face of plate 20 and of a number to correspond with the number of pockets 19', each selector being disposed immediately below one of the pockets, the supporting plate 25 which is secured to the plate 20 being formed with a concaved portion 26 which directs the seeds into the selector. A protecting plate 27 is positioned on the distributing plate 20, said plate 27 being provided with the flange 28 which extends within the central depression formed on the face of the plate 20, said flange being provided with a notch 20'' which receives a projection 20' carried by the plate 20, the plate 27 thus being held against displacement.

In order to prevent the pressure of the grain contained within the hopper from interfering with the grain as the same is deposited within the selectors, the plate 28' is provided, this plate being provided with the segmental projection 29 which is reduced in thickness and which is bolted or otherwise secured to the annular supporting frame 14'. The plate 28' rests upon the protecting plate 27 and is provided with the bifurcated extension 30, said extension being curved to lie in the path of the pockets formed in the plate 20. Supported between the bifurcations of said extension is a wiping finger 31, arranged on the transverse pin 32, said finger being held in yielding contact with the plate by means of spring 33, which is coiled about the transverse pin, one end of said spring bearing against the finger, the other end bearing against the plate 28'. The wiping finger 31 terminates in the beveled enlargement 34 which is of a configuration which will remove the surplus grain from the plate, preventing the grain from clogging as the plate 20 passes beneath the overhanging plate 28'. The pockets formed in the plate 20 are of a size which will hold approximately a certain number of seeds and this wiping of the surplus seeds from the plate accurately regulates the amount of seed which is fed to the selectors. The plate 19 is supported on the shaft 21. A sleeve 35 is secured to the shaft 21 and arranged on said sleeve is a pinion 36 which is housed by the conical member 17, said pinion meshing with a pinion 37 arranged on the drive shaft 38, the conical member forming a housing for the gears and a bearing for the drive shaft 38. It will be noted by this construction that the gearing is effectually protected. Arranged on the shaft 21 adjacent its lower end are wipers 40 which conduct the grain which falls within the lower hopper, to the chute 41 which is formed integral with said lower hopper and which distributes the grain to a mechanism which transfers the same to the upper hopper.

In operation the surplus grain is removed by the resilient wiper 31, and the selectors are secured to the upper face of the plate 20.

From the foregoing it will be noted that the distributing mechanism is driven in a simple and convenient manner, the gearing which drives the same being effectually housed. Attention is called to the arrangement of the distributing plate and the manner in which the same is supported, it being noted that the entire structure is such as may be cheaply and readily manufactured, the various parts being easily assembled.

What is claimed is:—

1. In a corn planter a lower hopper, standards secured to said lower hopper, a distributing mechanism supported by said standards, said distributing mechanism comprising a plate provided with a central depression, a hopper supported by said plate.

2. In a corn planter, a lower hopper, standards supported by said lower hopper, a plate supported by said standards, said plate being formed with a central depression arranged to receive a distributing mechanism and a hopper supported by said plate.

In testimony that I claim the foregoing as my own, I have hereto affixed my signature in the presence of two witnesses.

JOHN A. ANDERSON.

Witnesses:
F. A. PETERSON,
CHARLES G. DAVIS.

Copies of this patent may be obtained for five cents each, by addressing the "Commissioner of Patents, Washington, D. C."